April 16, 1968   B. WEINGARTNER   3,378,638
HIGH FREQUENCY CIRCUIT ARRANGEMENT FOR CAPACITIVE TRANSDUCER
Filed May 18, 1964

INVENTOR.
BERNHARD WEINGARTNER
BY
AGENT

United States Patent Office 3,378,638
Patented Apr. 16, 1968

3,378,638
HIGH FREQUENCY CIRCUIT ARRANGEMENT
FOR CAPACITIVE TRANSDUCER
Bernhard Weingartner, Vienna, Austria, assignor to
Akustische u. Kino-Gerate Gesellschaft m.b.H.,
Vienna, Austria, a firm
Filed May 18, 1964, Ser. No. 368,246
Claims priority, application Austria, May 20, 1963,
A 4,072/63
7 Claims. (Cl. 179—1)

ABSTRACT OF THE DISCLOSURE

An electrostatic microphone circuit includes a transformer having a center tapped secondary winding connected together with a capacitor microphone and a fixed capacitor in a bridge circuit. The primary winding of the transformer is connected to the output of a high frequency oscillator. A parallel resonant L-C circuit is connected between the center tap of the secondary and the junction of the microphone and fixed capacitor. The nominal operating frequency of the oscillator is determined by the bridge circuit and lies between the resonant frequency and the cut-off frequency of the resonant circuit. A demodulating circuit is coupled to the secondary winding and to one end of the resonant circuit. A variation in the capacitance of the microphone produces an unbalance of the bridge circuit and also produces a frequency modulation of the oscillator output signal whereby the sensitivity of the circuit to the signal frequency is increased to produce an increase in the signal-to-noise ratio of the circuit.

---

Figure 1:
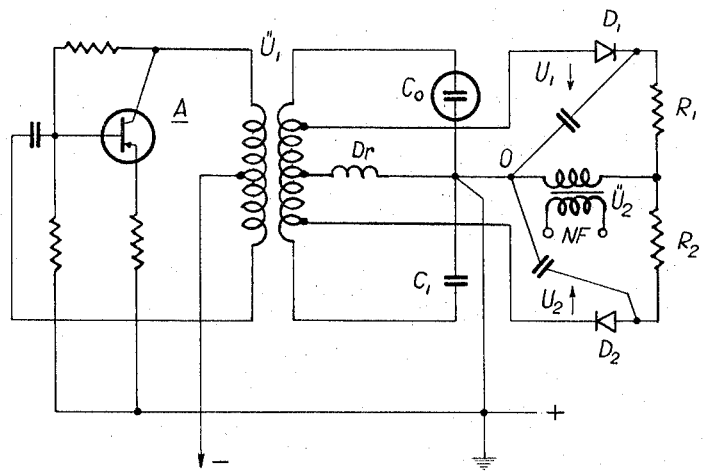

This invention relates to a circuit arrangement for electro-acoustic transducers of the electrostatic type particularly condenser microphones.

The known transducer circuit arrangements may be divided into two groups. In one group, the capacitive transducer is given a predetermined, constant, electric charge, and variations in capacitance caused by the diaphragm movements result in variations of the voltage developed across an operating resistor. These variations in voltage are proportional to the movement of the diaphragm. This circuit arrangement is widely used and is referred to as an audiofrequency circuit.

The difficulties involved in this group of circuit arrangements are due to the fact that operating resistors having a very high resistance must be used because the capacitance of the microphone is very small. This gives rise to insulation problems and requires means to oppose the inconvenient phenomena which are due to the high resistance of the control circuits (grid circuits of electronic tubes).

In the other group of circuit arrangement for condenser microphones, the movement of the diaphragm results in a variation of the capacitance of the transducer, and this variation is transformed into an at least approximately proportional variation of a parameter, e.g., the amplitude, phase or frequency of an auxiliary oscillation signal of high frequency. For this reason, these circuit arrangements are generally referred to as high frequency circuits.

One of the best known circuit arrangements of this kind is the Riegger circuit, in which the variation of the capacitance of the condenser microphone results in a frequency modulation of the high-frequency auxiliary oscillation. When this oscillation is then demodulated by any of the known circuits, an audiofrequency voltage is obtained which corresponds to the signal of the transducer.

In another high frequency circuit, the amplitude of the high frequency oscillation voltage is varied in synchronism with the variations of the capacitance of the transducer. This arrangement results in an amplitude-type modulation including only the side band components but no carrier component. The carrier then must be reinserted in the detector stage in proper phase. This can only be accomplished by means of special circuits.

In another high-frequency circuit which has been disclosed, a condenser microphone is included in one arm of a bridge and connected in series with a capacitor forming the adjoining arm of the bridge. In this case, the high frequency voltage is applied by means of a transformer, the secondary winding of which consists of two symmetrical halves, which form the two opposite arms of the bridge. The alternating voltage having an audiofrequency modulation is derived from the diagonal of the bridge by means of an audiofrequency transformer, which lies in the diagonal of a diode bridge circuit. The direct current path for this bridge diagonal is closed by a high frequency choke in the diagonal of the high frequency bridge.

The main disadvantage of this circuit arrangement is its low sensitivity. The modulation of the high frequency oscillations caused by the variations of the capacitance of the condenser microphone when exposed to sound is very small so that interfering modulations and the inherent noise of the demodulating circuit result in an unsatisfactory signal-to-noise ratio.

It is an object of the invention to reduce the above-mentioned disadvantages of a high frequency circuit arrangement for capacitive transducers in which the transducer is connected in one branch of a bridge circuit in series with a capacitor and the other branch of the bridge circuit contains symmetrical windings of a supply transformer, and an inductance element is provided in that diagonal of the bridge which extends from a center tap of the transformer. This is achieved according to the invention in that the sensitivity of the arrangement is increased by the provision in said bridge diagonal of a single parallel resonant circuit, or of a plurality of such circuits coupled together to form a band pass filter, and having a resonant frequency and a cut-off frequency lying on opposite sides of the frequency of an oscillator arranged to drive the bridge circuit via said supply transformer. In this way, an operating point is obtained which lies intermediate the center and cut-off frequencies of the resonant circuit arrangement.

From a more general aspect, the invention provides a high frequency circuit arrangement which comprises an oscillator having a predetermined frequency, a supply transformer having a primary winding connected to the output of said oscillator and a secondary winding having a center tap. The circuit arrangement further comprises a resonant circuit arrangement having a resonant frequency and a cut-off frequency on opposite sides of said predetermined frequency. The resonant circuit arrangement includes an inductance element and a capacitor in parallel having one end connected to said center tap. A capacitive transducer and a capacitor are connected in series across the secondary winding. The other end of said resonant circuit is connected to the junction of the transducer and capacitor. The circuit arrangement further includes an amplitude demodulating network coupled to said secondary winding and to said other end of the resonant circuit.

Figure 2:
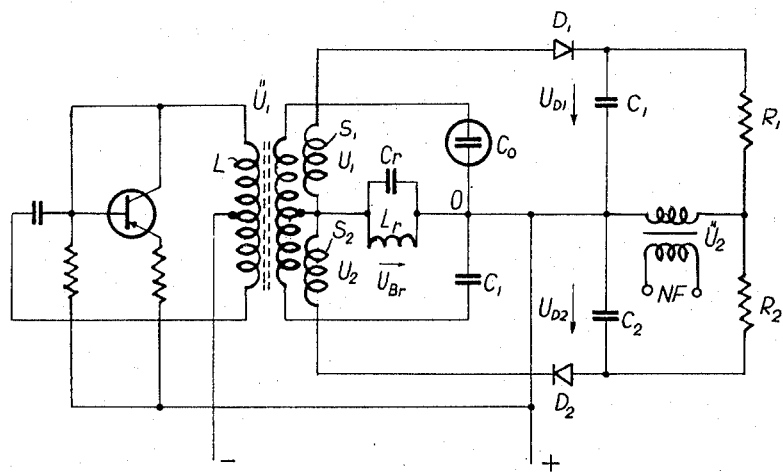

The invention will now be explained more fully with reference to the accompanying drawing, in which FIG. 1 shows the prior art circuit arrangement on which the invention is based and FIG. 2 shows an illustrative embodiment of the invention.

In the known bridge circuit shown in FIG. 1, the circuit A designates a transistor oscillator having, e.g., a frequency between 500 and 2000 kilocycles per second. The oscillation frequency of this oscillator is essentially determined by the inductance of the high frequency transformer $Ü_1$ and the two series-connected capacitances $C_0$ and $C_1$. $C_0$ is the capacitance of the condenser microphone and $C_1$ a capacitance having approximately the same value. When both capacitances have the same value, the high frequency voltages $U_1$ and $U_2$ applied to the two diodes $D_1$ and $D_2$ have also the same value so that the demodulated noise voltages modulating the amplitude of the high frequency oscillations are compensated for a major part at the audiofrequency transformer $\ddot{U}_2$. In practical operation, however, the two capacitances $C_0$ and $C_1$ are never perfectly equal and there are also stray couplings which cannot be controlled. As a result, a residual noise voltage remains at the transformer $\ddot{U}_2$ and is also effective at the output. It is an object of the invention to improve the ratio of the signal to this noise by an increase in sensitivity.

The circuit operates as follows: If the condenser microphone is exposed to sound, this will result in a change of its capacitance $C_0$ and of the voltage ratio $U_1/U_2$ whereas the sum of the two voltages $U_1+U_2$ at the secondary windings $S_1$ and $S_2$ remains constant. These secondary windings will be referred to hereinafter. Demodulation results then at the primary winding of the transformer $\ddot{U}_2$ in the appearance of a differential voltage, which is proportional to the variation of the value of the capacitance $C_0$ and constitutes the audiofrequency voltage which can be utilized.

FIG. 2 shows the high frequency circuit arrangement provided according to the invention for condenser microphones in a development of the circuit arrangement described hereinbefore.

The variation of the value of the capacitance $C_0$ in response to sound modifies not only the bridge voltage but results also in a frequency modulation of the oscillator frequency. This fact is utilized according to the invention for a further increase in sensitivity. According to FIG. 2 this is effected by replacing the high frequency choke $Dr$ in the bridge diagonal 3—0 by a parallel resonant circuit or a band pass filter. The resonant frequency of the resonant circuit or the band pass filter is somewhat above or below the oscillator frequency so that the operating point lies on a sloping portion of the characteristic curve of the resonant circuit or band pass filter. If the frequency of the oscillator is changed by the variation of the capacitance when the microphone is exposed to sound, the voltage at the parallel resonant circuit will be varied and this voltage variation will be vectorially added to the voltage variation effected by the unbalancing of the bridge. This feature increases the sensitivity of the transducer approximately three times without involving an increase in the noise voltage. In the illustrative embodiment of the invention shown in FIG. 2, a parallel resonant circuit connected in the bridge diagonal 0—3 consists of the inductance $L_r$ and the capacitance $C_r$. The diodes $D_1$ and $D_2$ are connected in this case, e.g., by separate secondary windings $S_1$ and $S_2$, which enable a variation of the transmission ratio within wide limits. In other respects, the circuit arrangement does not basically differ from the arrangement shown in FIG. 1.

Instead of the condenser microphone, another capacitive transducer may be used as a modulating member in the circuit. Examples of such transducers are capacitive-type pressure responsive signal generators, microphones responsive to sound conducted through solids, extensometers, etc.

In a practical embodiment of the circuit shown in FIG. 2, the oscillator A had a frequency of 1.5 megacycles per second and the resonant circuit $Cr-Lr$ had a resonant frequency of 1.36 megacycles per second, a frequency swing $\Delta f=680$ cycles per second at 100 microbels, and a Q equal to 5.

What is claimed is:

1. A high frequency circuit arrangement comprising, an oscillator for generating a signal of a predetermined frequency, a supply transformer having a primary winding connected to the output of said oscillator and a secondary winding having a center tap, said circuit arrangement further comprising a resonant circuit having a resonant frequency and a cut-off frequency on opposite sides of said predetermined frequency, said resonant circuit including an inductance element and a capacitance element in parallel having one end connected to said center tap, a capacitive transducer and a capacitor connected in series across said secondary winding, the inductance of said transformer and the capacitance of said transducer and capacitor being chosen so that said oscillator nominally operates at said predetermined frequency, means connecting the other end of said resonant circuit to the junction of said transducer and said capacitor, and a demodulating network coupled to said secondary winding and to said other end of said resonant circuit.

2. A high frequency circuit arrangement as set forth in claim 1 further comprising additional capacitors and inductors combined together and with said resonant circuit to form a plurality of coupled parallel resonant circuits together constituting a band pass filter.

3. A high frequency circuit arrangement as set forth in claim 1, in which said predetermined frequency is 1.5 megacycles per second and said resonant circuit arrangement has a resonant frequency of 1.36 megacycles per second, a frequency swing $\Delta f=680$ cycles per second at 100 microbels, and a Q equal to 5.

4. A high frequency circuit as set forth in claim 1, in which said capacitive transducer is a condenser microphone.

5. An electrostatic microphone circuit comprising, a transformer having a primary winding and a secondary winding having a center tap dividing said secondary into two equal sections, a capacitive transducer, a fixed capacitor, means connecting said second winding, said transducer and said capacitor together to form a bridge circuit in which said two secondary sections comprise one branch and said transducer and capacitor comprise the second branch, an oscillator having its output circuit connected to said primary winding so that said bridge circuit determines the operating frequency of the oscillator, an inductor and a capacitor connected together to form a parallel resonant circuit having a resonant frequency and a cut-off frequency that straddle the nominal operating frequency of said oscillator, means connecting said resonant circuit between said center tap and the junction of said transducer and said fixed capacitor, and a demodulating circuit coupled to said resonant circuit.

6. A microphone circuit as described in claim 5 wherein said demodulating circuit comprises, first and second diodes, first and second resistors, second and third capacitors, means connecting said first diode, said first resistor, said second resistor, and said second diode in series, in that order, and to one end of said resonant circuit, means serially connecting said second and third capacitors across said first and second resistors, a second transformer having a primary winding connected between the junction of said second and third capacitors and the junction of said first and second resistors, and means connecting one end of said second transformer primary winding to the other end of said resonant circuit, said first and second diodes being connected with series aiding polarity.

7. An electrostatic microphone circuit comprising, a transformer having a primary winding and first and second secondary windings, each of said secondary winding having a center tap dividing said secondaries into two sections, a capacitive transducer, a fixed capacitor, means connecting said first secondary winding, said transducer and said capacitor together to form a bridge circuit in which said two secondary sections of said first secondary winding comprise one branch and said transducer and capacitor comprise the second branch, an oscillator having its output circuit connected to said primary winding so that said bridge circuit determines the operating frequency of the oscillator, an inductor and a capacitor connected together to form a parallel resonant circuit having a resonant frequency and a cut-off frequency that straddle the nominal operating frequency of said oscillator, means connecting said resonant circuit between said center tap of said first secondary winding and the junction of said transducer and said fixed capacitor, a demodulating network including first and second diodes connected in series aiding polarity across said second secondary winding, and means connecting one end of said resonant circuit to the center tap of said second secondary winding and the other end to a junction in said demodulating network intermediate said first and second diodes.

References Cited

UNITED STATES PATENTS 2,496,818  2/1950  Seeley _____ 329—129
3,310,628  3/1967  Cragg _____ 179—1

WILLIAM C. COOPER, *Primary Examiner.*

KATHLEEN H. CLAFFY, *Examiner.*

R. P. TAYLOR, *Assistant Examiner.*